United States Patent
Agrawal et al.

(10) Patent No.: US 7,379,932 B2
(45) Date of Patent: May 27, 2008

(54) SYSTEM AND A METHOD FOR FOCUSED RE-CRAWLING OF WEB SITES

(75) Inventors: Neeraj Agrawal, New Delhi (IN); Sreeram Viswanath Balakrishnan, New Delhi (IN); Sachindra Joshi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 11/314,432

(22) Filed: Dec. 21, 2005

(65) Prior Publication Data

US 2007/0143263 A1 Jun. 21, 2007

(51) Int. Cl.
*G06F 17/30* (2006.01)
(52) U.S. Cl. .................... 707/3; 707/1; 707/2
(58) Field of Classification Search ............... 707/1–7, 707/10, 100, 104.1, 101; 709/217; 715/513
See application file for complete search history.

(56) References Cited

U.S. PATENT DOCUMENTS

| | | | |
|---|---|---|---|
| 6,418,433 B1 | 7/2002 | Chakrabarti et al. | |
| 6,516,312 B1 * | 2/2003 | Kraft et al. | 707/3 |
| 6,611,835 B1 | 8/2003 | Huang et al. | |
| 7,080,073 B1 * | 7/2006 | Jiang et al. | 707/7 |
| 7,231,405 B2 * | 6/2007 | Xia | 707/104.1 |
| 2003/0149694 A1 | 8/2003 | Ma et al. | |
| 2004/0030683 A1 | 2/2004 | Evans et al. | |
| 2005/0086206 A1 | 4/2005 | Balasubramanian et al. | |
| 2005/0138056 A1 | 6/2005 | Stefix et al. | |

OTHER PUBLICATIONS

Soumen Chakrabarti, Martin Van Den Berg; Byron Dom; http://www.cs.berkeley.edu/~soumen/doc/www1999f/pdf/prelim.pdf ; 1999; Computer Networks; Amsterdam, Netherlands.

* cited by examiner

*Primary Examiner*—Don Wong
*Assistant Examiner*—Marc R Filipczyk
(74) *Attorney, Agent, or Firm*—Gibb & Rahman, LLC (57) ABSTRACT

A method (100) of crawling the Web (620) is disclosed. The method (100) crawls (120) Web pages on the Web starting from a given (110) set of seed Universal Resource Locators (URLs). Crawled Web pages are partitioned (140) into sets of relevant and irrelevant pages. A set of exclusion and/or inclusion patterns are discovered (150) from the sets of relevant and irrelevant pages, and subsequent crawling of the Web is restricted through the set of exclusion and/or inclusion patterns.

9 Claims, 6 Drawing Sheets

SYSTEM AND A METHOD FOR FOCUSED RE-CRAWLING OF WEB SITES

FIELD OF THE INVENTION

The present invention relates generally to World Wide Web crawling, hence hypertext resource discovery, and, in particular, to re-crawling previously crawled World Wide Web pages in a manner whereby pages found not to be relevant are excluded from subsequent crawls.

BACKGROUND

The enormous popularity of the World Wide Web, simply referred to as the Web, has made available a vast amount of information However, without applications being available to process the information available from the Web, and therefore extract useful information, full benefit can not be derived from the available information. Accordingly, several applications have become available that process the available information and provide useful insights with regards to that information An essential part of many of such applications is crawling, which is hypertext resource discovery.

The process of crawling may be divided into the follows steps:
1. Providing to the crawling application a set of Universal Resource Locators (URLs), called seed URLs, and an integer k, known as depth The seed URLs are placed by the crawler application in a queue of un-crawled URLs.
2. For each URL in the queue of un-crawled URLs the crawler application performs the steps of:
   a) fetching the Web page associated with the URL;
   b) extracting all the hyperlinks present in the fetched Web page;
   c) passing the Web pages referenced by the hyperlinks through exclusion/inclusion patterns;
   d) determining whether the Web pages that passed through the exclusion/inclusion patterns were already crawled, and if not, placing the URLs of the un-crawled Web pages into the queue of un-crawled URLs.

The set of seed URLs along with depths are derived manually. The inclusion/exclusion patterns, which act as filters on the Web pages to determine their relevance, are also derived manually and provided to the crawler application. As an example, the term ".gif" may be designated as an exclusion pattern, which will ensure that GIF images are not fetched during the crawling process.

It is noted that the crawling process terminates once the given depth for each seed URL is reached, as the already crawled Web pages are not put back in the queue of un-crawled URLs once the given depth is reached for that seed URL. This strategy of crawling as may be referred to as blind crawling, as crawling involving this strategy collects all the Web pages that are accessible from the set of seed URLs at a distance of equal or less than the given depth for each seed URL.

However, due to the exponential growth of the Web blind crawlers are challenged by the scale of the Web. Accordingly, methods are required that can smartly crawl the Web pages of interest with minimal computing and network resources.

Two variations to the blind crawling strategy that have been proven useful for several applications in the attempt to minimize the computing and networking resources are as follows:

1. In several applications, only a fraction of the crawled pages are relevant for the application. Techniques named "focused crawling" have been proposed to reduce the computing and networking resource requirements in such scenarios. Rather than collecting all the Web pages accessible through the set of seed URLs, a focused crawler finds the hyperlinks that are likely to be most relevant for the application at hand. Several methods have been proposed to select the hyperlinks that are likely to be relevant from a Web page;
2. Several applications require the set of Web pages already crawled to be crawled again at regular intervals in order to ensure the information, and the crawlers knowledge of the hyperlinks on those Web pages, are up-to-date. These applications crawl the set of Web pages of interest and then re-fetch each Web page separately at the determined refresh rate for the Web page. The refresh rate for any Web page is typically determined based on the history of the changes on that Web page. The re-fetch of a Web page in this setting in fact makes a connection to the URL of the Web page followed by fetching the page. If the links on the crawled pages are not fetched then this process may be referred to as "re-fetching". If all the Web pages that are accessible from the crawled Web page are also crawled then this process may be referred to as "re-crawling".

The above strategies have led to significant savings in computing and networking resources, and have helped to keep the crawls more up-to-date.

The URLs associated with hyperlinks on a Web page may be categorized in two different types, namely:
1) URLs that are present always or for relatively long durations, and therefore referred to as stable URLs; and
2) URLs that exist only for a smaller duration, referred to as temporary URLs.

It is noted that the content of stable URLs could still change with time. In contrast temporary URLs exist only for a short time on a Web page. To illustrate the difference between stable and temporary URLs, consider for example the URL of a home page of a news site. That home page URL would be a stable URL. However, a URL of a Web page containing a news item will be a temporary URL, as that URL will only exist for a short time while that news item has relevance. A set of new temporary URLs is typically created each day, with those URLs containing news items of that day.

Many applications require focused crawling followed by re-fetching. Focused crawling is required to be able to collect only the pages that are relevant for the application at hand and re-fetching may be required to ensure that the crawler application is up-to-date. It is important to note that for re-fetching to be meaningful only the content of Web pages should change and URLs of Web pages should not change i.e. Web pages should have stable URLs. If the set of relevant pages contains temporary URLs then re-fetching can not be done as the temporary URLs would cease to exist on the Web page. This makes the re-crawling of the sites inevitable for ensuring an up-to-date crawler application.

While several methods have been proposed to identify potentially relevant URLs in a Web page, focused crawling in general has not been found to be very useful in practice. The main reason for the lack of utility of focused crawling to date is that it is difficult to determine the relevancy of a Web page without considering its content.

U.S. Published Patent Application No. 20050086206 describes a method of "focused crawling" that aims at gathering documents that are relevant to any of the given "focused topics". The rules used to detect the relevance of a page by that method are predetermined, and remain unchanged during subsequent crawling.

U.S. Published Patent Application No. 20030149694 discloses path-based ranking of unvisited Web pages for Web crawling, via identifying all the paths beginning with a seed URL and leading to visited relevant Web pages as a "good-path set", and for each unvisited Web page, identifying the paths beginning from the seed URL leading to such a Web page as a "partial-path set". All the visited web pages are then classified and each web page is labelled with the labels of a class or classes it belongs to. A statistical model is also trained for generalizing the common patterns among all ones of the "good-path set". Finally, the "partial-path set" is evaluated with the statistical model and the unvisited web pages are ranked with the evaluation results.

Hence, the method disclosed in that application ranks the unvisited Web pages with a relevance scores obtained from the statistical model learnt by the path URLs of relevant pages. The ranked list of Web pages helps a crawler in fetching the relevant pages first.

U.S. Published Patent Application No. 20040030683 discloses a system which conducts subsequent extensive searches (referred to as recrawl) of previously encountered web sites to update a database (e.g., update a web site's respective site map, update the directory of encountered sites, delete a site map, delete a URL from the directory). The system utilizes statistically and/or heuristically determined criteria to conduct subsequent searches to ensure the accuracy of the system's database. The system is suited for searching and retrieving network based content by using metadata about the content.

U.S. Published Patent Application No. 20050138056 discloses a user adding inclusion constraints and exclusion constraints which create a boundary that specifies which documents are sought and which are not. A system is presented that could be used to define a "working set" of the corpus that is a subset of the overall corpus obtained in response to a query. A mechanism for the visual representation of the working set is also provided. That method is not related to crawling.

SUMMARY

It is an objective of the present invention to crawl Web pages of interest with minimal computing and network resources.

According to the invention, the Web is crawled starting from a given set of seed Universal Resource Locators (URLs). Crawled Web pages are partitioned into sets of relevant and irrelevant pages. A set of exclusion and/or inclusion patterns is discovering from the sets of relevant and irrelevant pages. Subsequent crawling of the Web is restricted through said set of exclusion and/or inclusion patterns.

Methods, apparatus and computer program products for focused re-crawling of websites are disclosed.

BRIEF DESCRIPTION OF THE DRAWINGS

One or more embodiments of the present invention will now be described with reference to the drawings, in which.

DETAILED DESCRIPTION

For reasons explained in the "Background" section, focused crawling experiences difficulty in determining the relevance of a Web page without considering its content. In this disclosure, a new method of hypertext resource discovery is disclosed which is referred to as "focused re-crawling". Focused re-crawling is particularly useful for the applications that require only a fraction of all the Web pages that are accessible from a set of seed URLs. Further the set of URLs corresponding to the relevant Web pages contain temporary URLs. It rules out the options of re-fetching the relevant pages and makes re-crawling essential to ensure that the crawling is up-to-date.

The proposed method entirely crawls Web pages hyperlinked from a set of seed URLs. A classifier is then used to detect relevant Web pages from the crawled Web pages. From the relevant Web pages a set of exclusion and/or inclusion patterns are determined that guides a blind crawling process towards only relevant pages. The determined set of exclusion/inclusion patterns make sure that irrelevant Web pages are not crawled during the blind crawling process.

The proposed method of focused re-crawling may for example be used in an application that extracts information about the business world from a set of general news Web sites on a daily basis. The set of Web pages that contain business news is the set of relevant pages for the application, and are also typically grouped together in a Web site.

Figure 1:
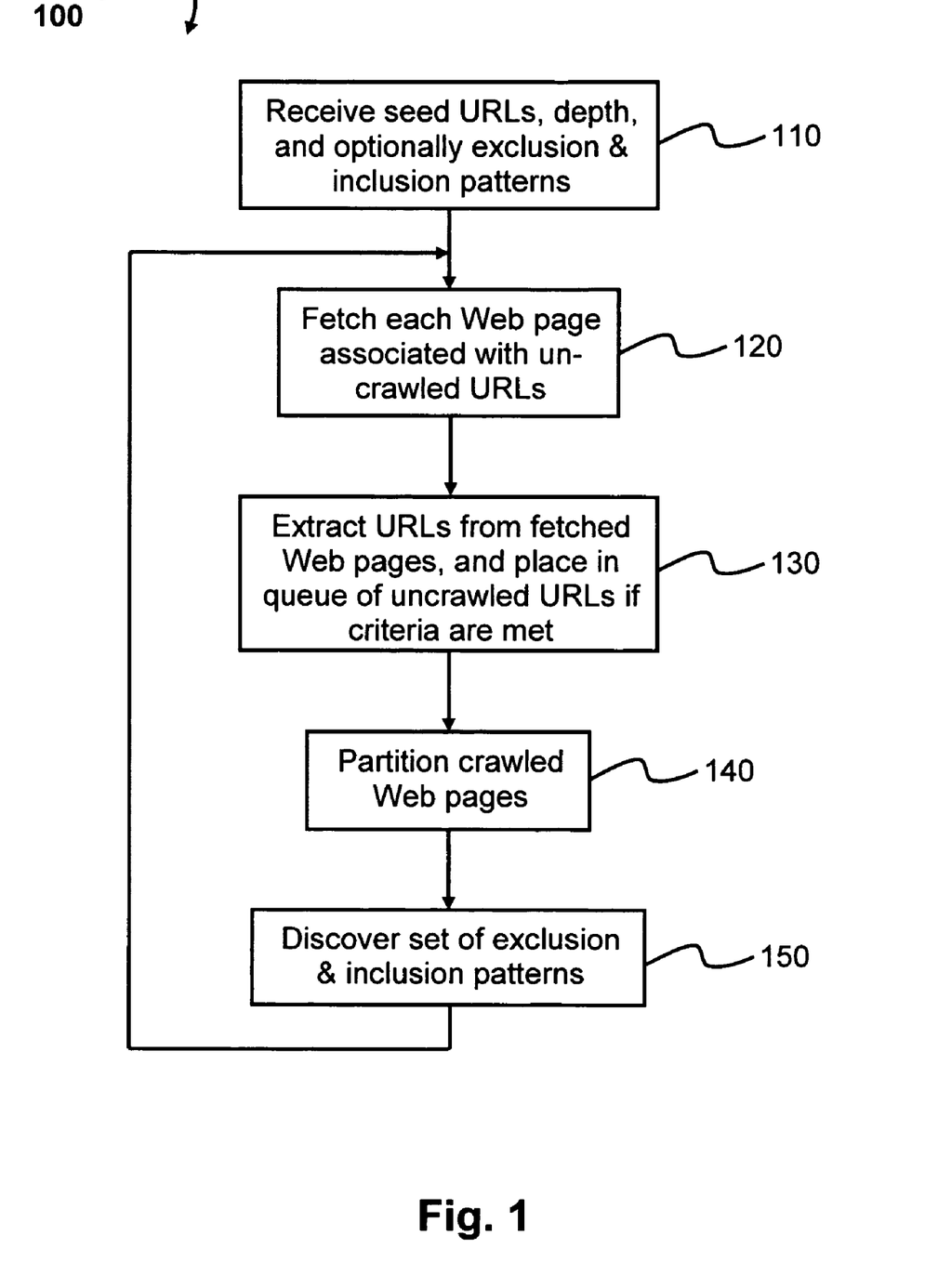
FIG. 1 shows a schematic flow diagram of the proposed focused re-crawling process.
Figure 2:
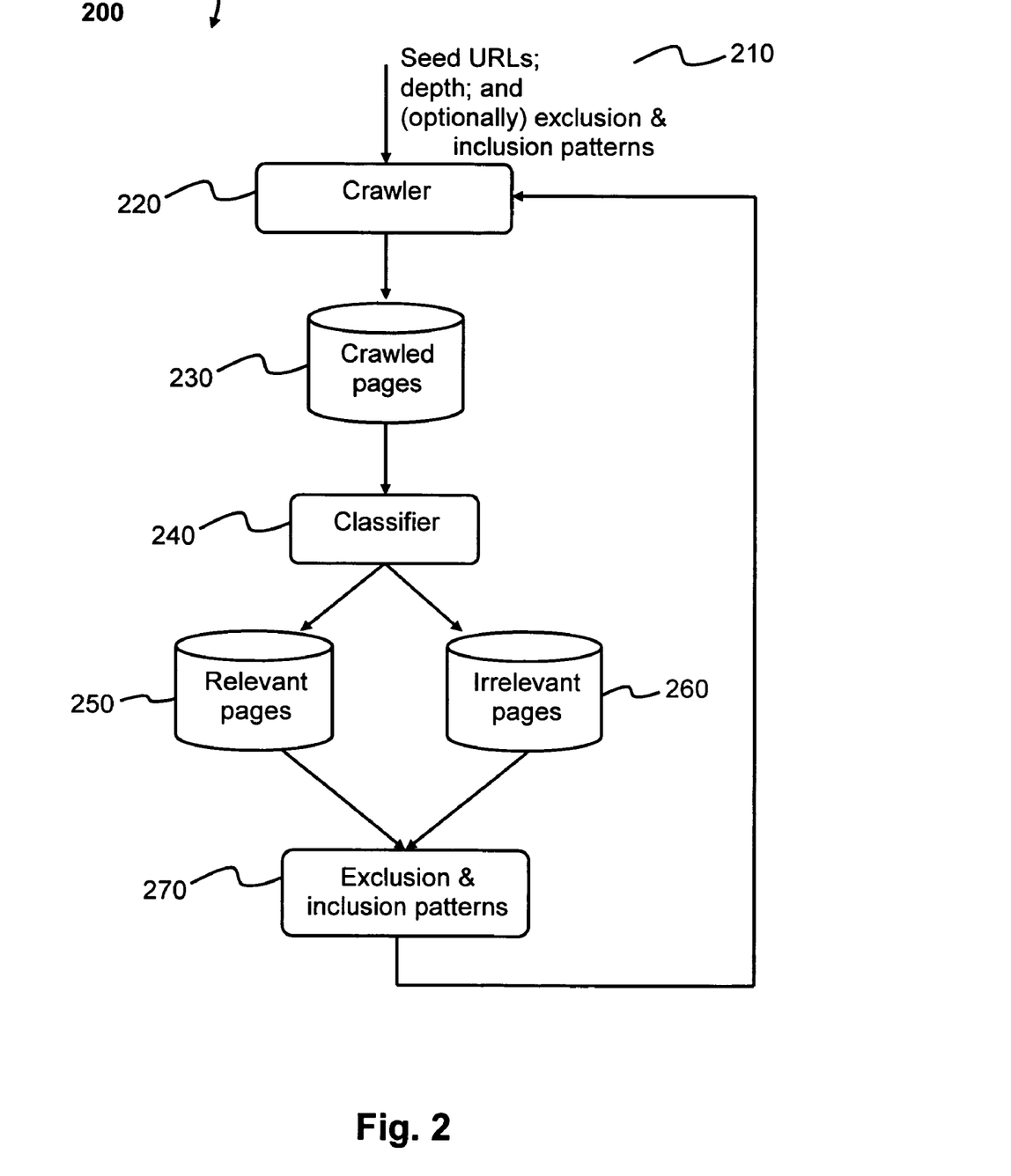
FIG. 2 shows an overview schematic flow diagram of focused re-crawling.

FIG. 1 shows a schematic flow diagram of the proposed focused re-crawling process 100. FIG. 2 shows an overview schematic flow diagram of focused re-crawling 200.

Figure 6:
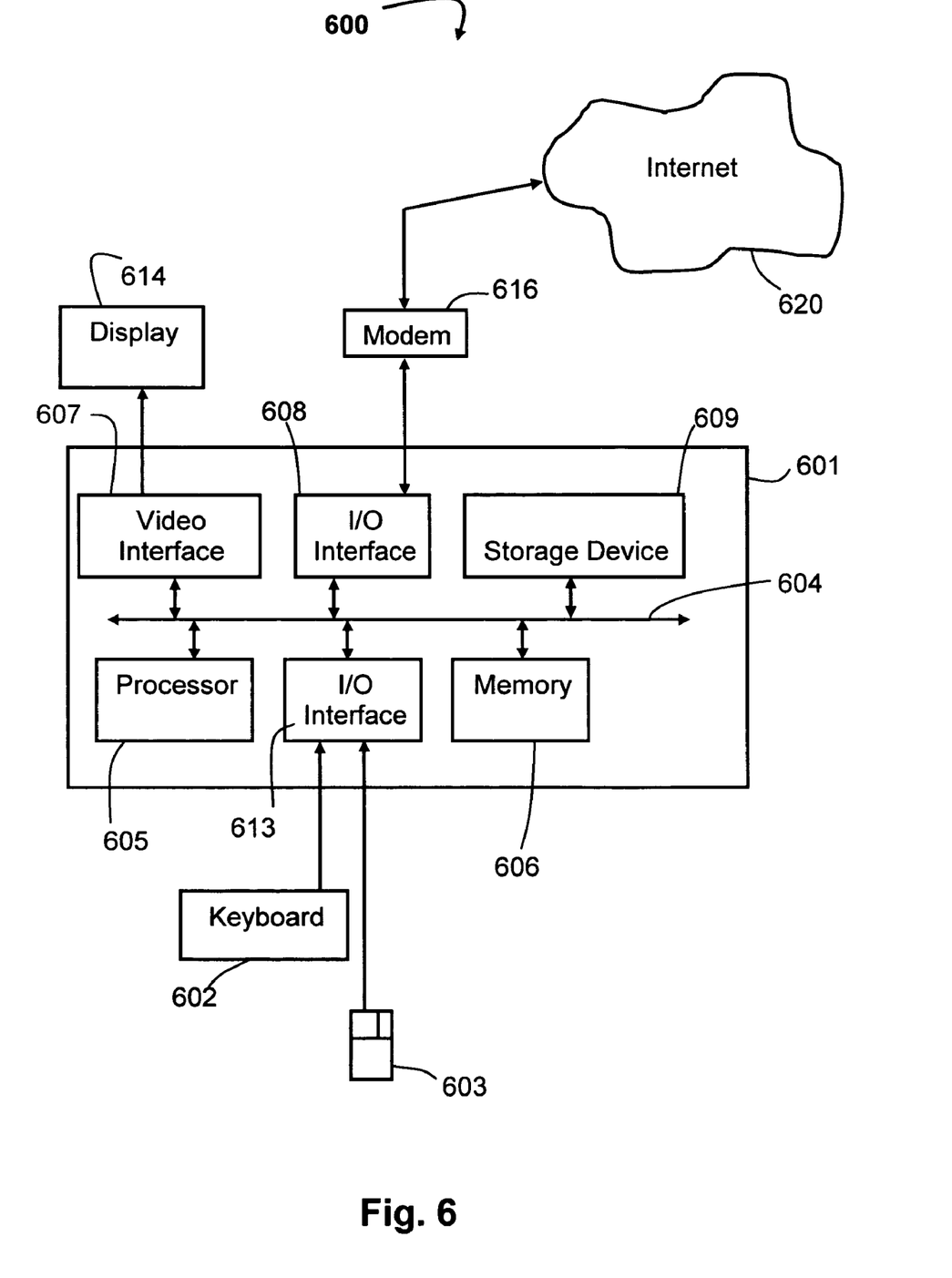
FIG. 6 is a schematic block diagram of a general purpose computer upon which arrangements described can be practiced.

The proposed focused re-crawling process 100 is preferably practiced using a general-purpose computer system 600, such as that shown in FIG. 6 wherein the sub-processes of FIG. 1 may be implemented as software. The software may be stored in a computer readable medium, including the storage devices described below, for example. The software is loaded into the computer from the computer readable medium, and then executed by the computer system 600. A computer readable medium having such software or computer program recorded on it is a computer program product The use of the computer program product in the computer preferably effects an advantageous apparatus for performing focused re-crawling.

The computer system 600 is formed by a computer module 601, input devices such as a keyboard 602 and mouse 603, output devices including a display device 614. A Modulator-Demodulator (Modem) transceiver device 616 is used by the computer module 601 for communicating to and from the Internet 620.

The computer module 601 typically includes at least one processor unit 605, and a memory unit 606. The module 601 also includes an number of input/output (I/O) interfaces including a video interface 607 that couples to the video display 614, an I/O interface 613 for the keyboard 602 and mouse 603, and an interface 608 for the modem 616. A storage device 609 is provided and typically includes at least a hard disk drive. The components 605 to 613 of the computer module 601, typically communicate via an interconnected bus 604 and in a manner which results in a conventional mode of operation of the computer system 600 known to those in the relevant art.

Typically, the software is resident on the storage device 609, and read and controlled in its execution by the processor 605. Intermediate storage of the program and any data fetched from the Internet 620 may be accomplished using the semiconductor memory 606, possibly in concert with the storage device 609. In some instances, the software may be supplied to the user encoded on a CD-ROM or floppy disk and read via a corresponding drive, or alternatively may be read by the user from the Internet 620 or other network via the modem device 616. Still further, the software can also be loaded into the computer system 600 from other computer readable media. The term "computer readable medium" as used herein refers to any storage or transmission medium that participates in providing instructions and/or data to the computer system 600 for execution and/or processing.

Referring to FIGS. 1 and 2 simultaneously, the focused re-crawling process 100 starts by receiving in step 110 as input 210 a set of seed URLs, an integer as the crawling depth, and optionally a set of exclusion/inclusion patterns. The seed URLs are placed in a queue of un-crawled URLs.

In step 120 each Web page associated with an URL in the queue of un-crawled URLs is then fetched by a crawler 220. All URLs found on the fetched Web pages are extracted in step 130 and placed in the queue of un-crawled URLs if certain criteria are met. Those criteria include that such Web pages should:

not already be crawled;

be less than the crawling depth from the seed URL;

pass through the inclusion patterns (if such exist); and not pass through the exclusion patterns (if such exist).

All fetched pages are placed in a set of crawled pages 230. If the URL of a Web page is not placed in the queue of un-crawled URLs because at least one of the above criteria was not met, then that Web page is not fetched by the crawler 220, and Web pages hyperlinked from such Web pages are also not fetched. Similarly, Web pages which are hyperlinked by at least one crawled Web page would also be fetched provided that their depth is not more than the given depth and their URLs do not contain any exclusion pattern.

The process 100 continues in step 140 where the set of crawled Web pages 230 are partitioned by a classifier 240 into sets of relevant 250 and irrelevant pages 260 respectively. Any classifier 240 may be used for this purpose. Using the set of relevant 250 and irrelevant pages 260, a set of exclusion/inclusion patterns 270 is discovered in step 150. Step 150 is described in more detail below.

The set of exclusion/inclusion patterns discovered in step 150 is then fed back to the crawler for use during regular re-crawls of the Web pages, starting at the given seed URLs in the manner described above. Steps 120 to 150 are repeated during each re-crawl. The set of exclusion/inclusion patterns 270 ensures that the process of blind crawling gathers only the Web pages of interest.

Having described an overview of the focused re-crawling process 100, discovery of the set of exclusion/inclusion patterns 270 from the set of relevant 250 and irrelevant pages 260, performed in step 150, is now described in more detail. The results obtained from the classifier 240 can not be used directly for the discovery of exclusion/inclusion patterns. The sets of relevant 250 and irrelevant pages 260 need to be modified such that all the relevant pages 250 can be crawled.

Figure 3:
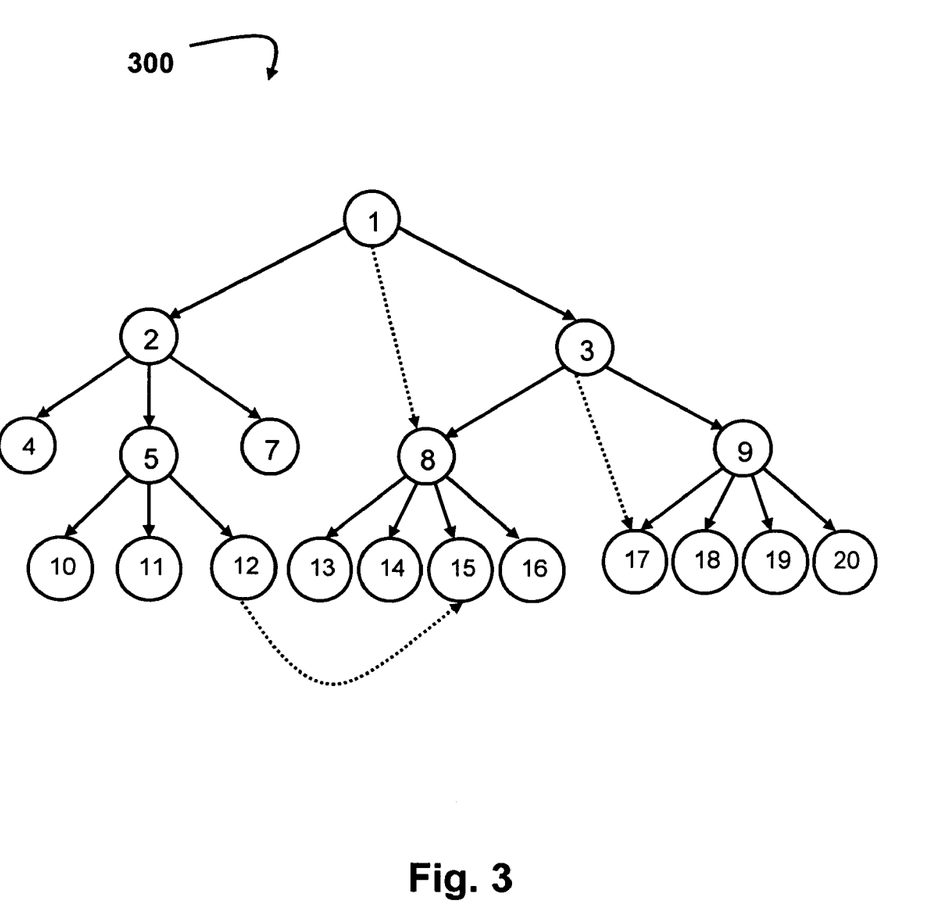
FIG. 3 shows an example site graph obtained through crawling the Web.

FIG. 3 shows an example site graph 300 obtained through crawling the Web, wherein each node 1 to 20 represents a Web page, and the edges between the nodes 1 to 20 represent hyperlinks that exist between the respective nodes 1 to 20. For example, the Web page associated with the seed URLs and represented by node 1 contains 3 hyperlinks to the Web pages represented by nodes 2, 3 and 8 respectively.

Figure 4:
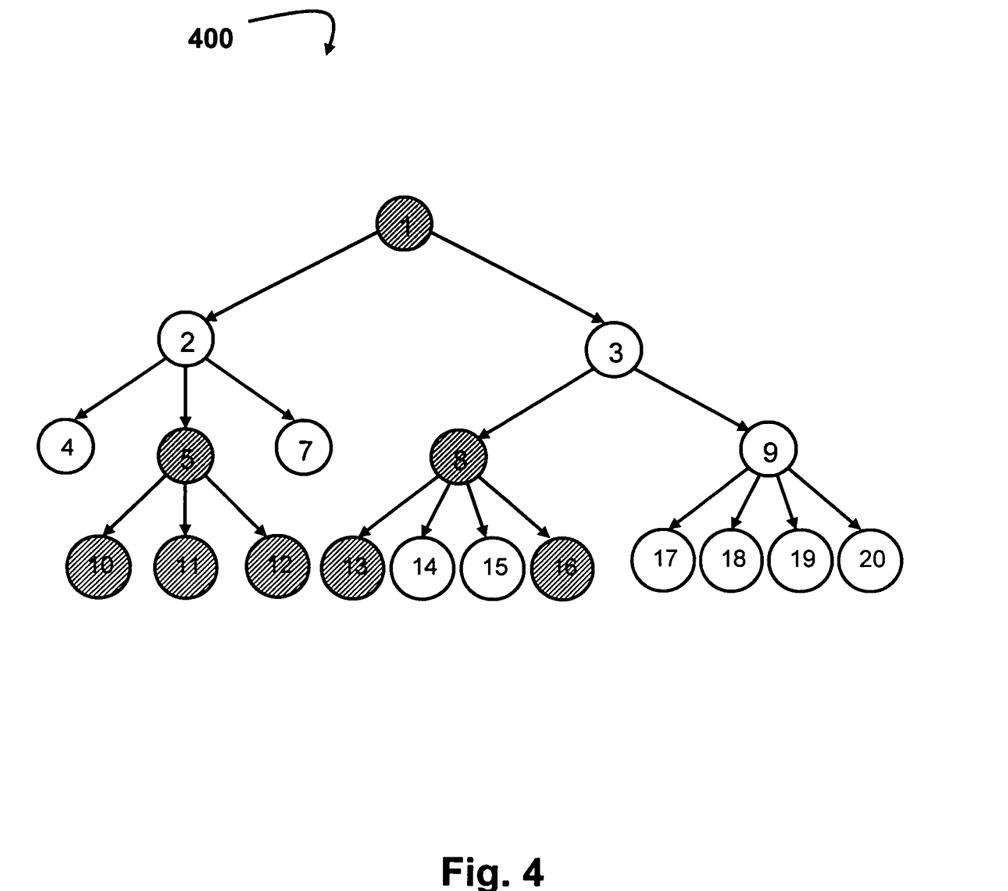
FIG. 4 shows a crawl tree of the example site graph shown in FIG. 3.

FIG. 4 shows a crawl tree 400 of the example site graph 300 shown in FIG. 3, with corresponding nodes being given the same reference numerals. In fact, crawl tree 400 is a sub-graph of the site graph 300. The crawl tree 300 is a breadth first tree rooted at the seed URL in the site graph 300.

As set out above with regards to step 140, the classifier 240 partitions the set of crawled Web pages 230 into sets of relevant 250 and irrelevant pages 260 respectively. In the example the nodes of the crawl tree 400 partitioned to the set of relevant pages 250 are hatched. Accordingly, nodes 1, 5, 8, 10 to 13, and 16 have been determined by the classifier 240 as being relevant Web pages.

In order to discover the set of inclusion/exclusion patterns 270 from the set of relevant 250 and irrelevant pages 260 the relevancy of pages has to be "rolled up" the crawl tree 400. The roll up process propagates the relevancy of pages from leave nodes to associated root nodes. Accordingly, any node that leads to a relevant page during the crawling process also becomes relevant; irrespective of its own classification. The process maybe performed either on the crawl tree 400 or on the site graph 300.

Figure 5:
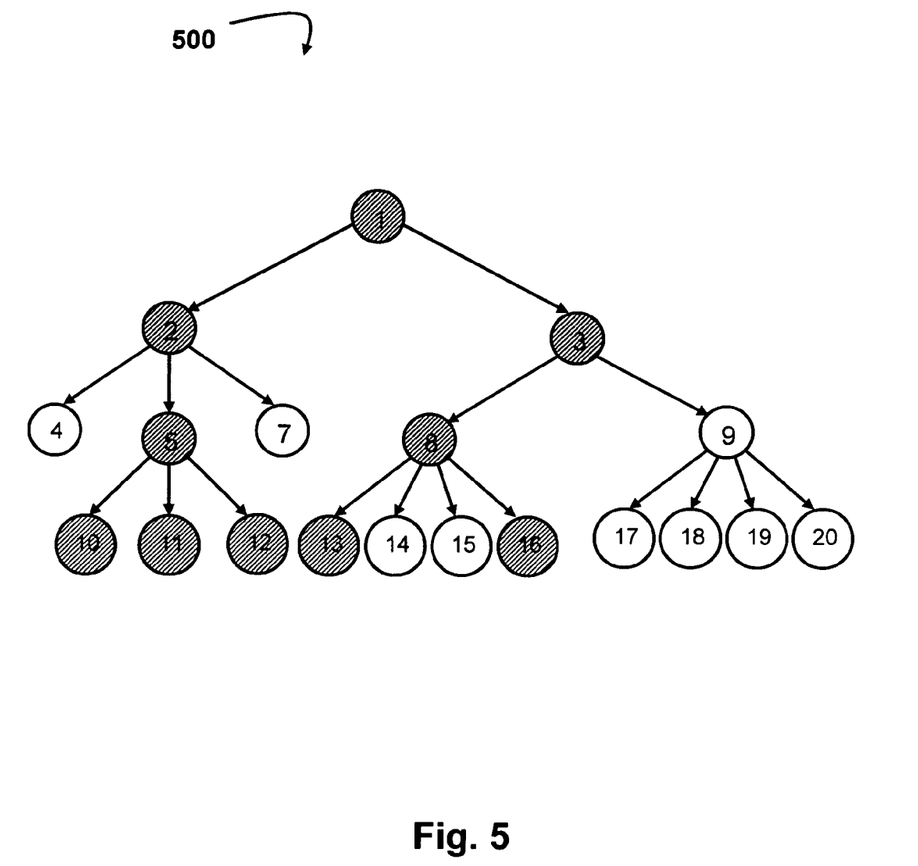
FIG. 5 shows a crawl tree resulting from performing the roll up process on the crawl tree of FIG. 4.

FIG. 5 shows a crawl tree 500 resulting from performing the roll up process on the crawl tree 400 of FIG. 4. As can be seen when comparing the crawl trees 400 and 500, nodes 2 and 3 became relevant after the roll up process as both of those nodes 2 and 3 lead to relevant nodes.

It is noted that the roll-up process on the crawl tree 400 does not yield optimal sets of relevant 250 and irrelevant pages 260. During the roll-up process node 3 becomes relevant because of the relevancy of node 8. In the site graph 300 node 8 is directly connected with node 1, and is therefore reachable from the seed URL. Node 3 is not needed to be crawled as node 3 is not relevant according to the classification, and further, node 3 does not lead to any relevant page solely reachable through node 3. This makes the crawling of node 3 redundant. Such nodes may be referred to as redundantly relevant nodes.

In order to provide more optimum sets of relevant 250 and irrelevant pages 260, the roll-up process is preferably performed on the site graph 300. A minimum Steiner tree is found of the site graph 300 rooted at the node 1 associated with the seed URL that contains all the nodes from the set of relevant pages. Several methods exist that solve the problem of finding the minimum Steiner tree on graphs. By finding the minimum Steiner tree of the site graph 300 the number of redundantly relevant nodes may be reduced.

Following the roll up process, two sets URL_G and URL_B of URLs are constructed corresponding to relevant and irrelevant Web pages respectively. Set URL_G contains the URLs corresponding to relevant pages, whereas the set URL_B contains URLs corresponding irrelevant pages.

A set of exclusion patterns are then determined such that all the URLs present in the set URL_B satisfy at least one of these exclusion patterns and no URL from the set URL_G satisfy any of these exclusion patterns. Accordingly, given two sets URL_G and URL_B, a set of exclusion patterns P is discovered such that $$\forall u \in URL\_B; \exists p \in P \text{ s.t. } u \text{ satisfies } p$$

AND $$\forall v \in URL\_G; \neg \exists p \in P \text{ s.t. } v \text{ satisfies } p \qquad (1)$$

Different languages may be used for representation the exclusion patterns. In one embodiment, only the presence or absence of words is used as the language for inclusion/exclusion patterns. Alternatively, bi-grams may be used. In a second embodiment, regular expressions of words are used to represent the patterns.

In the preferred implementation the absence or presence of words is used as a pattern language, in which case an algorithm to discover the exclusion patterns operates as follows:

function find_exclusion_patterns (URL_G, URL_B)

1. Exclude all the words that appear in URLS in the set URL_G from the words appearing in URLS in the set URL_B; and 2. Use the set containing the remaining words from URLs in set URL_B as the set of exclusion patterns.

As an alternative to discovering the exclusion patterns, a set of inclusion patterns or both a set of inclusion ands exclusion patterns may be determined. The process to discovering the inclusion patterns involves determining the inclusion patterns such that all the URLs present in the set URL_G satisfy at least one of these inclusion patterns and no URL from the set URL_B satisfy any of these inclusion patterns.

The foregoing describes only some embodiments of the present invention, and modifications and/or changes can be made thereto without departing from the scope and spirit of the invention, the embodiments being illustrative and not restrictive.

In one alternative embodiment, only the topmost irrelevant nodes are put in the set URL_B. It is noted that all the descendents of an irrelevant node would be irrelevant. As an example, the node 9 would be put in the set URL_B and all its descendent would not appear in this set. Putting only the top irrelevant nodes in the set URL_B makes sure that their descendent nodes would not be crawled through the selected irrelevant nodes. However, some of irrelevant nodes may still be crawled through some other paths in the site graph 300. As an example, node 17 which is an irrelevant node may still be crawled in this embodiment through node 3.

In accordance with another alternative embodiment all the irrelevant nodes are put in the set URL_B. This ensures that no irrelevant node would be crawled through alternative paths in the site graph 300.

The proposed focused re-crawling process 100 has the advantage that the exclusion/inclusion patterns are refined each time the process 100 is performed. Accordingly, process 100 allows the Web pages of interest to be crawled using reduced computing and network resources.

We claim:

1. A method of crawling the Web, said method comprising:
   crawling Web pages on the Web starting from a given set of seed Universal Resource Locators (URLs);
   partitioning crawled Web pages into sets of relevant and irrelevant pages;
   discovering from said sets of relevant and irrelevant pages a set of exclusion and inclusion patterns; and
   restricting subsequent crawling of the Web through said set of exclusion and inclusion patterns, wherein said discovering comprises:
   re-partitioning irrelevant pages containing a link to at least one relevant page as relevant;
   forming a first set containing words appearing in URLs from relevant pages;
   forming a second set containing words appearing in URLs from irrelevant pages; and
   determining a set of exclusion patterns such that all words from said second set satisfy at least one of said exclusion patterns and no words from said first set satisfy any of said exclusion patterns.

2. A method according to claim 1, all the limitations of which are incorporated herein by reference, further comprising finding a minimum Steiner tree before performing said re-partitioning.

3. A method of crawling the Web, said method comprising:
   crawling Web pages on the Web starting from a given set of seed Universal Resource Locators (URLs);
   partitioning crawled Web pages into sets of relevant and irrelevant pages;
   discovering from said sets of relevant and irrelevant pages a set of exclusion and inclusion patterns; and
   restricting subsequent crawling of the Web through said set of exclusion and inclusion patterns, wherein said discovering comprises:
   re-partitioning irrelevant pages containing a link to at least one relevant page as relevant;
   forming a first set containing words appearing in URLs from relevant pages;
   forming a second set containing words appearing in URLs from irrelevant pages; and
   determining a set of inclusion patterns such that all words from said first set satisfy at least one of said exclusion patterns and no words from said second set satisfy any of said exclusion patterns.

4. A program storage device readable by computer, tangibly embodying a program of instructions executable by said computer to perform a method of crawling the Web, said method comprising:
   crawling Web pages on the Web starting from a given set of seed Universal Resource Locators (URLs);
   partitioning crawled Web pages into sets of relevant and irrelevant pages;
   discovering from said sets of relevant and irrelevant pages a set of exclusion and/or inclusion patterns; and
   restricting subsequent crawling of the Web through said set of exclusion and/or inclusion patterns, wherein said discovering comprises:
   re-partitioning irrelevant pages containing a link to at least one relevant page as relevant;
   forming a first set containing words appearing in URLs from relevant pages; and
   forming a second set containing words appearing in URLs from irrelevant pages;
   determining a set of exclusion patterns such that all words from said second set satisfy at least one of said exclusion patterns and no words from said first set satisfy any of said exclusion patterns.

5. A program storage device readable by computer, tangibly embodying a program of instructions executable by said computer to perform a method of crawling the Web, said method comprising:
   crawling Web pages on the Web starting from a given set of seed Universal Resource Locators (URLs);

partitioning crawled Web pages into sets of relevant and irrelevant pages;

discovering from said sets of relevant and irrelevant pages a set of exclusion and/or inclusion patterns; and restricting subsequent crawling of the Web through said set of exclusion and/or inclusion patterns, wherein said discovering comprises:

re-partitioning irrelevant pages containing a link to at least one relevant page as relevant;

forming a first set containing words appearing in URLs from relevant pages;

forming a second set containing words appearing in URLs from irrelevant pages; and determining a set of inclusion patterns such that all words from said first set satisfy at least one of said exclusion patterns and no words from said second set satisfy any of said exclusion patterns.

6. A program storage device according to claim 5, all the limitations of which are incorporated herein by reference, further comprising finding a minimum Steiner tree before performing said re-partitioning.

7. A method of crawling a network, said method comprising:

crawling network pages on the network starting from a given set of seed Universal Resource Locators (URLs);

partitioning crawled network pages into sets of relevant and irrelevant pages;

discovering from said sets of relevant and irrelevant pages a set of exclusion and inclusion patterns; and restricting subsequent crawling of the network through said set of exclusion and inclusion patterns, wherein said discovering comprises:

re-partitioning irrelevant pages containing a link to at least one relevant page as relevant;

forming a first set containing words appearing in URLs from relevant pages;

forming a second set containing words appearing in URLs from irrelevant pages; and determining a set of exclusion patterns such that all words from said second set satisfy at least one of said exclusion patterns and no words from said first set satisfy any of said exclusion patterns.

8. A method of crawling a network, said method comprising:

crawling network pages on the network starting from a given set of seed Universal Resource Locators (URLs);

partitioning crawled network pages into sets of relevant and irrelevant pages;

discovering from said sets of relevant and irrelevant pages a set of exclusion and inclusion patterns; and restricting subsequent crawling of the network through said set of exclusion and inclusion patterns, wherein said discovering comprises:

re-partitioning irrelevant pages containing a link to at least one relevant page as relevant;

forming a first set containing words appearing in URLs from relevant pages; and forming a second set containing words appearing in URLs from irrelevant pages;

determining a set of inclusion patterns such that all words from said first set satisfy at least one of said exclusion patterns and no words from said second set satisfy any of said exclusion patterns.

9. A method according to claim 8, all the limitations of which are incorporated herein by reference, further comprising finding a minimum Steiner tree before performing said re-partitioning.

* * * * *